July 5, 1938.　　L. LEITZ ET AL　　2,122,671
CAMERA SHUTTER MECHANISM
Filed Aug. 8, 1936　　5 Sheets-Sheet 1
Fig. 1
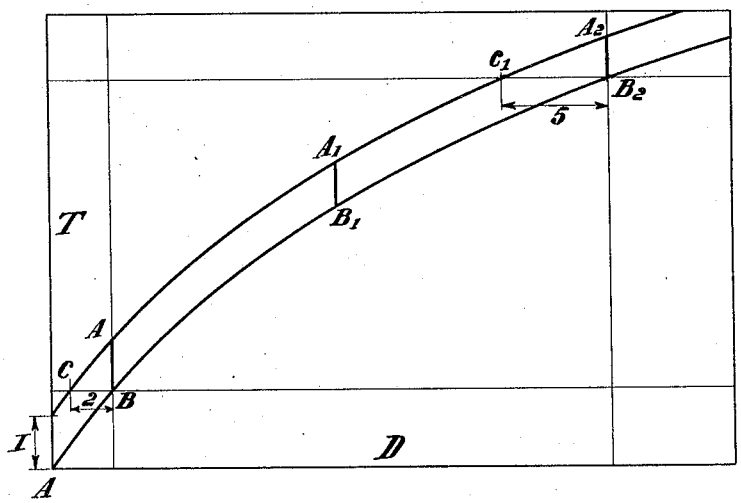
Fig. 15
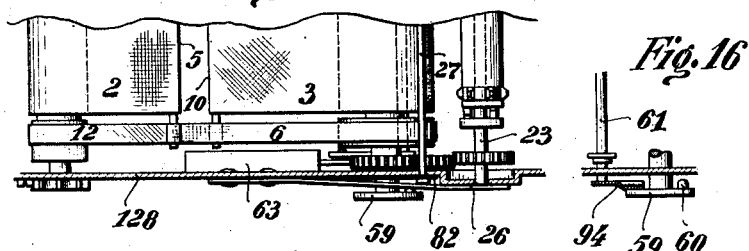
Fig. 16
Fig. 17
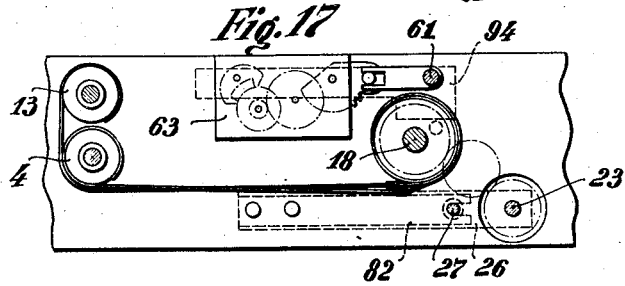
INVENTORS
Ludwig Leitz
Willi Stein
BY
ATTORNEY
Ivan E. A. Konigsberg

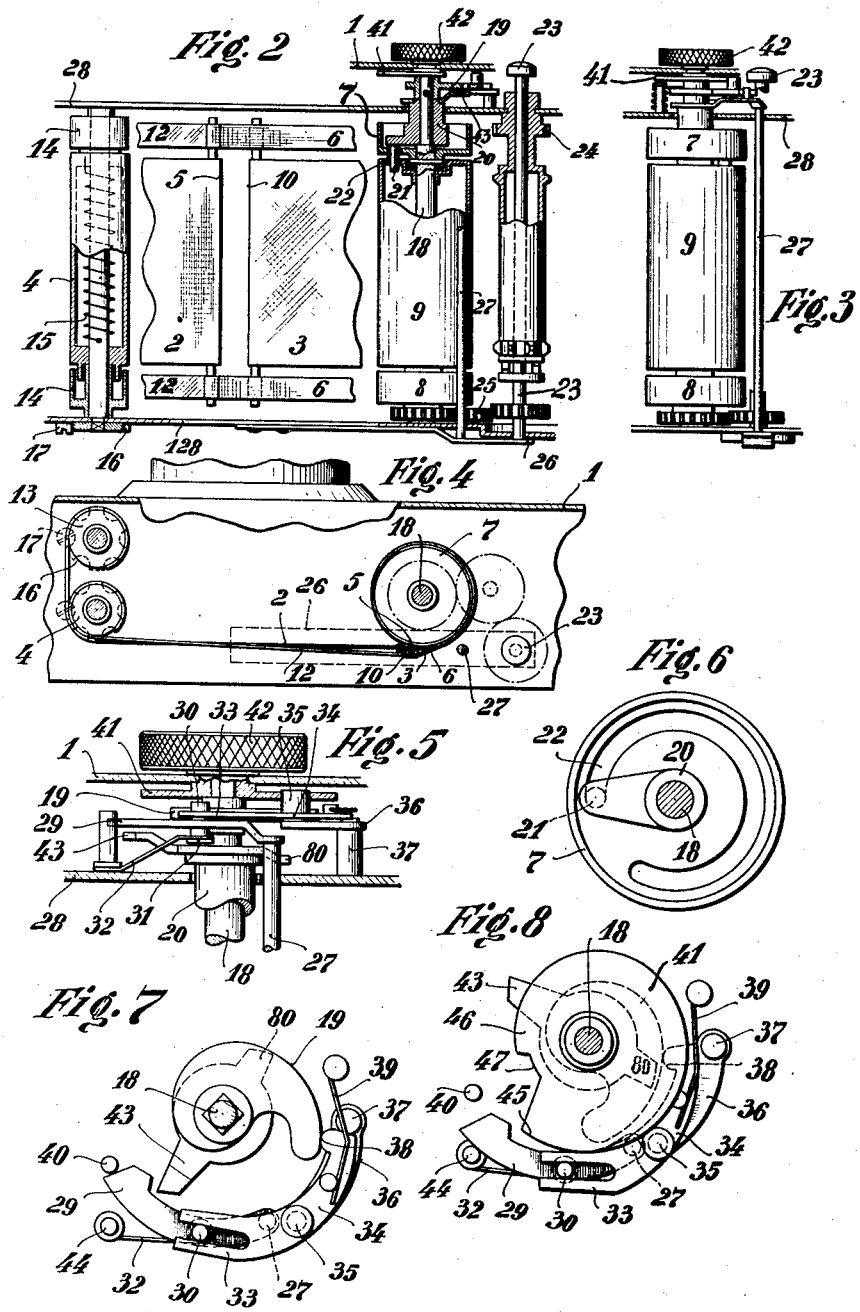

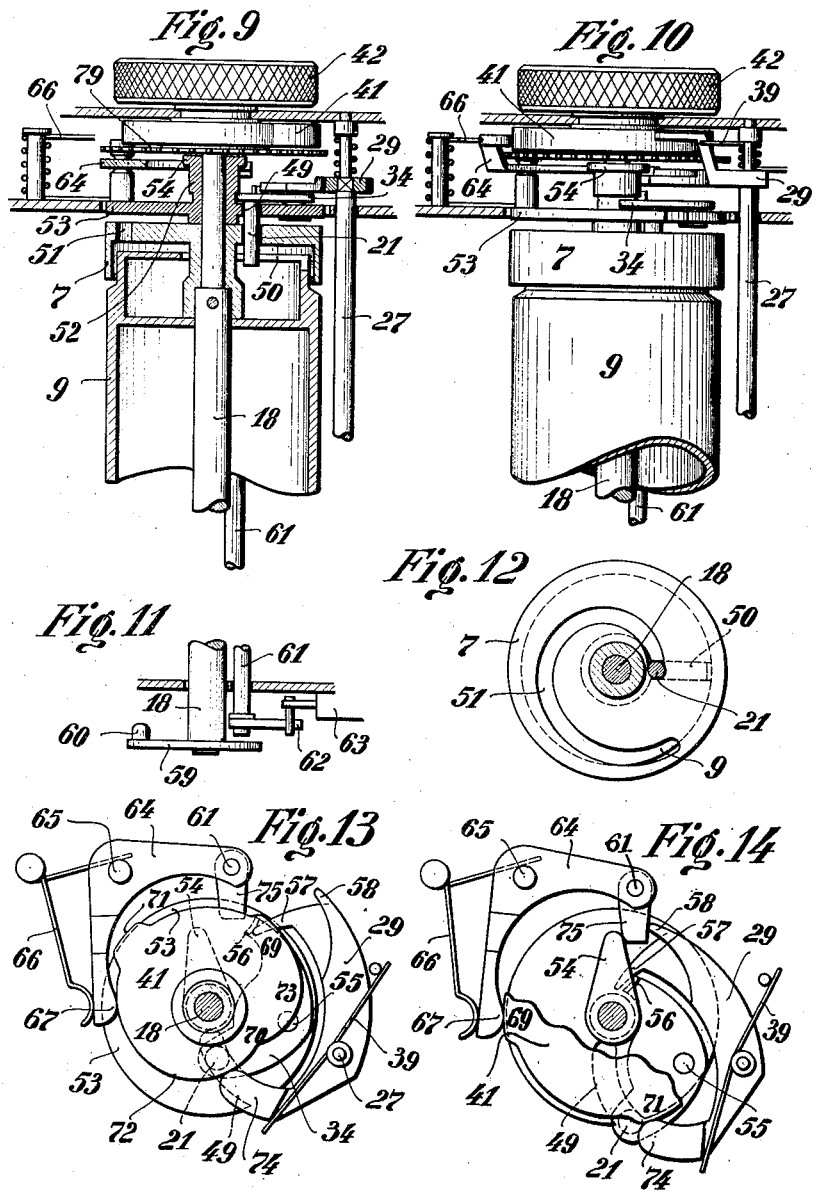

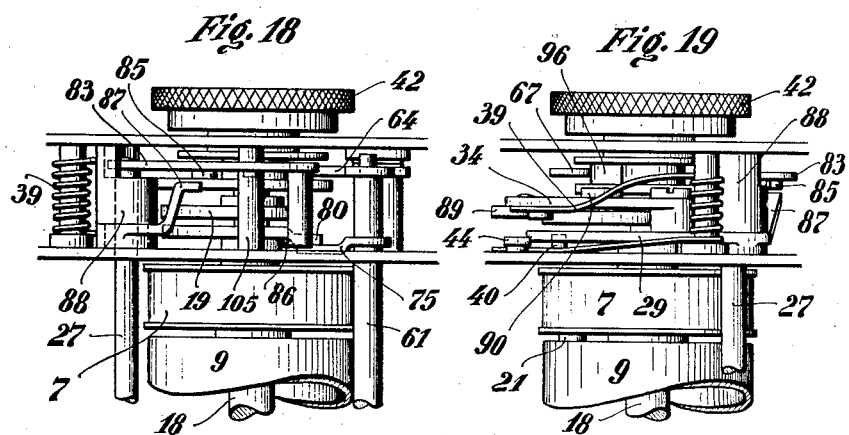
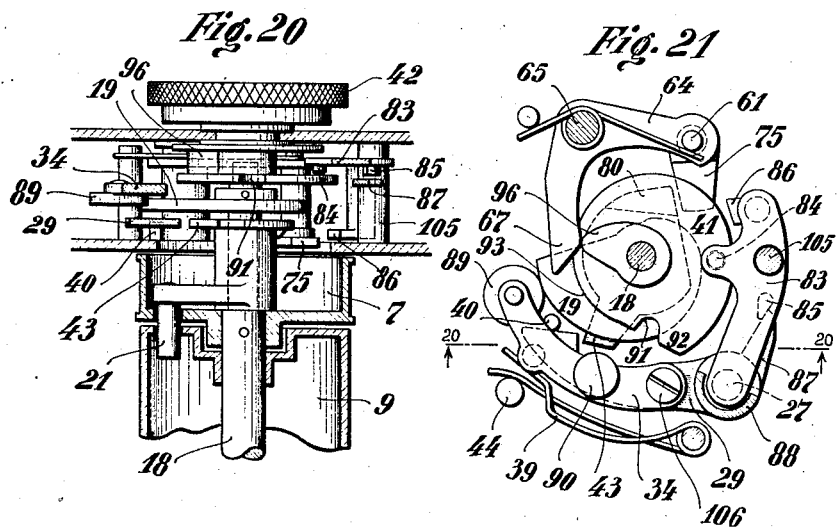

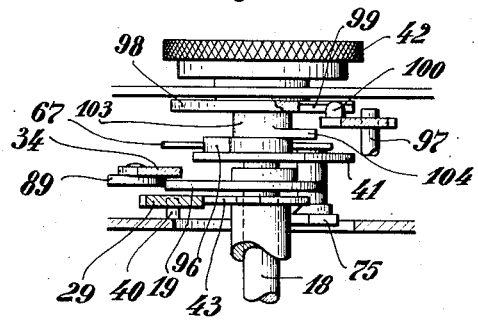
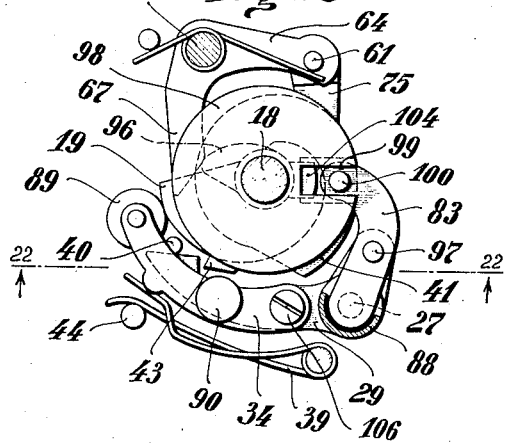
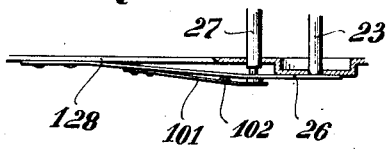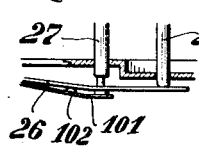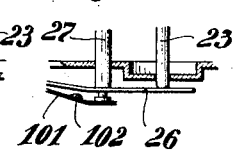

Patented July 5, 1938

2,122,671

UNITED STATES PATENT OFFICE 2,122,671

CAMERA SHUTTER MECHANISM

Ludwig Leitz and Willi Stein, Wetzlar, Germany, assignors to Ernst Leitz, G. m. b. H., Wetzlar, Germany Application August 8, 1936, Serial No. 94,890
In Germany September 30, 1935

21 Claims. (Cl. 95—57)

This invention relates to improvements in camera shutter mechanisms of the type in which the shutter is formed of two curtains which are released one after the other in order to form an exposure opening. Such shutters are known in the art and are called focal plane shutters.

In prior structures the curtains are operatively coupled together when released in order to obtain a shutter opening of constant width for each exposure. But inasmuch as the springs which operate or draw the curtains across the film or plate impart an increasing speed to the two curtains, it has been found that the last portion of the film is underexposed if the exposure opening between the curtains remains the same while an exposure is being made.

The object of this invention is to provide a curtain shutter mechanism for photographic cameras in which the two curtains are released one after the other and are operated in a manner to avoid uneven exposure. That is to say, the two shutter curtains are released one after the other and moved across the film with the same acceleration of speed at the same points of their travel, but due to the fact that the two curtains are not coupled together, but are released independently with a time interval, the shutter opening is greater at the end of the exposure than at the beginning. In other words the higher speed at the finish of the exposure, which causes faulty exposure when the shutter opening remains the same, is according to this invention compensated for by a gradual increase in the width of the shutter opening during the exposure.

It may be said that one feature of this invention consists in operating the shutter curtains in such a manner that the first curtain is able to run away from the second curtain whereby to increase the distance between them at the finish of the exposure.

Another object of the invention is to provide a focal plane shutter mechanism peculiarly well adapted for use in a small camera because of its simple construction and automatic operation, and because the invention eliminates the coupling mechanism between the curtains. Still other objects of the invention will be pointed out hereinafter. The invention is embodied in a shutter mechanism and modifications thereof arranged and constructed as hereinafter described and as illustrated in the accompanying drawings in which Fig. 1 is a diagram illustrating the operation of the shutter curtains in accordance with the invention.

Fig. 2 is a view in elevation showing the shutter partly in section and with parts broken away.

Fig. 3 is an end view looking from the right in Figure 2.

Fig. 4 is a plan view of Figure 2 in diagrammatic outline with parts in section and parts removed.

Fig. 5 is an enlarged detail side view of the members which control the release of the second curtain, partly in section.

Fig. 6 is a top end view of the curtain roller for the second shutter curtain.

Fig. 7 is a plan view of Figure 5 with parts omitted and showing the elements in shutter wound-up positions.

Fig. 8 is a similar view showing the parts in position right after the release of the second curtain.

Figs. 9 to 14 illustrate a modification in which the several views will be specifically referred to hereinafter.

Figs. 15 to 21 illustrate a still further modification which, among other features, specifically includes the operation of an adjustable time operating mechanism for automatically producing longer time exposures. The several views will be described hereinafter.

Figs. 22 to 26 illustrate a still further modification.

As stated above one of the main objects of this invention is to provide a shutter mechanism which, while the two curtains operate at the same acceleration or increase in speed, provides for a gradually increasing exposure opening resulting automatically from the fact that the curtains are not coupled together. This feature of the invention is illustrated diagrammatically in Figure 1 in the form of a chart. The movements of the two exposure edges of the two curtains are illustrated by two curves. In the chart the curtain edges travel a distance from left to right represented by the base line D in a period of time represented by the vertical line T. The curve A, A1, A2 represents the first curtain edge. The curve B, B1, B2 represents the second curtain edge which is released a time interval I later than the first edge. The vertical lines A—B, A1—B1, A2—B2 represent the difference in time of the movements of the two edges at the same points of travel. They are alike. The distances C—B and C1—B2 represent the distances between the edges at the same time intervals or periods of travel. It will be noted that for instance if the exposure opening between the two curtains is 2 millimeters at the start, it is much more, say 5 millimeters, at the finish, resulting from the same difference in point of time or the same increase in speed at the same points. The mechanism hereinafter described is designed to obtain the result pictured in the diagram.

Referring now to Figures 2-8, the camera is identified by the outline of the housing 1. The shutter itself consists of two curtains 2 and 3. The first curtain 2 has its left hand edge, not shown, in Figures 2 and 4 secured to a spring roller 4. Its right hand edge 5 is connected by upper and lower ribbons 6, 6 to drums 7 and 8. The follow up or second curtain 3 has its right hand edge connected to the curtain roller 9. Its left hand edge 10 is connected by upper and lower ribbons 12, 12 to another spring roller 13, first passing around idler drums 14 on the first spring roller 4. The spring rollers have springs 15 which, in a well known manner, pull the curtains from the right in Figure 2 to the left. The ribbon connections between the curtains and the spring rollers, as well as with the curtain roller 9 is known in the art. The springs are tensioned by rotating nuts 16 on the roller shafts and held by locking the nuts by means of screws 17, see Figure 2. In normal wound up position only the first shutter curtain is stretched across the camera and serves to shut off the light from the objective to the film, it being stretched across the camera from the spring roller 14 to the curtain roller 9, its ribbons 6 being then wound upon the drums 7 and 8. The second curtain 3 is wound upon the roller 9 and its ribbons 12 are stretched from the curtain edge 10, i. e., from the roller 9 to and around the idlers 14 and thence to the spring roller 13. The free exposure edges 5 and 10 of the curtains overlap in wound up position to insure light tightness except when the shutter is opened for exposures. Figures 2 and 3 show the shutter curtains in a moment of passage past the objective. The edges 5 and 10 are then separated because the film is being exposed.

The curtain roller 9 is rotatably carried by a curtain shaft 18 which is supported in the camera casing. The ribbon drums 7 and 8 are fast on said shaft. At the top the shaft 18 carries a releasing cam 19 and a freely rotatable nipple 20. The latter has a depending pin 21 which extends down through a circular slot 22 in the drum 7 and into a hole in the end of the roller 9. The slot 22 permits the drum 7 to make almost a complete revolution. At the bottom the shaft 18 is geared to a shutter release shaft 23 which has a winding gear 24 by means of which the release shaft is rotated in a well known manner whereby to wind up the curtains upon the curtain roller 9 by way of gearing 25. The release shaft 23 is adapted to be pushed down against the force of a flat spring 26 so as to free said shaft from its winding mechanism and permit the springs 15 to pull the curtains across the camera with the edges separated to effect exposure.

Alongside the roller 9 there is supported a rod 27 which also rests upon the aforesaid spring 26. The top of the shaft 27 passes through a horizontal partition 28 and carries a pawl arm 29 having a pin 30 which passes through the pawl arm and has a flange 31 below the same. A spring 32 engages the flange 31 and tends to depress the pawl lever 29 and rod 27 against the lifting force of the bottom spring 26. The upstanding pin 30 is embraced by a fork 33 at the one end of a swingable release lever 34 which is pivoted upon a button 35 carried in the free end of an arm 36 pivoted at 37 upon the partition 28. A nose 38 upon the other end of the lever 34 is kept in engagement with the releasing cam 19, Figures 5 and 6, by a spring 39.

It will therefore be observed in Figure 7 that the cam 19 keeps the nose 38 in an outermost position and the fork 33 in an innermost position. The fork keeps the pawl arm 29 tipped against a stop pin 40.

The shaft 18 has its extreme top conveniently journalled within a timing cam 41 which is fast to a setting knob 42 which is freely rotatable upon the shaft to set the cam 41 for different time exposures. As shown in Figs. 2 and 5 the timing knob 42 and the timing cam 41 are connected by means of a reduced portion which passes through the cover of the camera 1 and frictionally engages the same so that said knob and cam will remain in adjusted positions irrespective of the rotation of the shaft 18 within the cam. The knob 42 carries in the usual manner on its top surface exposure figures adapted to be registered with a mark (not shown) on the housing 1. It will be noted in Figure 5 that the timing cam 41 is adapted to engage the button 35, the pivot of lever 34. Also that the pawl arm 29 is in a higher plane than a finger 43 upon the nipple 20 which rotates freely upon the shaft 18.

Figures 5 and 7 show the parts with the shutter in wound up position and the cam 41 has been set for a certain time exposure. When the shutter is wound up the shaft 18 is rotated and thus determines the position of the releasing cam 19 which is fast upon the shaft. The setting of the cam 41 determines the position of the button 35, Figure 7, and the spring 39 by pressing upon the lever 34 determines the position of the pawl arm 29. The position of the finger 43 upon the nipple 20 is determined by the position of the depending pin 21 which is at the end of the circular slot 22 which is rotated with the shaft 18.

When an exposure is to be made the photographer sets the knob 42 in the correct time position desired and thereby rotates the cam 41 so as to move the release lever 34 into a corresponding position, for instance as shown in Fig. 7. Of course, the shutter is first wound up and thus the release cam 19 is positioned to release the lever 34 at the beginning of an exposure as will presently be explained. He then presses the release shaft 23 down and releases it from the holding means, not shown, against the pressure of the spring 26. The spring 15 in the roller 4 immediately draws the first shutter 2 across the camera thereby of course rotating the ribbon drums 7, 8, the shaft 18 and the releasing cam 19. The slot 22 rotates with the drum 7, hence the depending pin 21 is free to move. The second curtain 3 would of course follow immediately after the first curtain 2 were it not prevented from doing so by the pawl arm 29 which now lies in the path of the finger 43 which latter is a part of the nipple 20 with the depending pin 21. The pawl arm 29 which normally is at a higher plane than the finger 43, Fig. 5, is moved down by the spring 32 acting upon the flange 31 of the pawl arm pin 30 when the resistance and support of the bottom spring 26 is removed by depressing the release shaft 23.

It will be remembered that the finger 43 is a part of the nipple 20. The spring roller 13 tends to unwind the second curtain 3 and rotate the roller 9. The latter however is in engagement with the depending pin 21 which is prevented from rotating because the pin 21 and the finger 43 are in one piece with the nipple 20. It follows that the second curtain does not move at this time.

However, the cam 19 rotates clockwise, Fig. 7, with the shaft 18, when the first curtain is released. Consequently the lever 34 can now swing inwardly upon its stationary pivot 35 and move the fork 33 outward to tip the pawl arm 29 moving it from stop pin 40 to another stop pin 44. The arm 29 is no longer in the path of the finger 43 which is now free to move, and the nipple 20 and pin 21 no longer prevents rotation of the curtain roller 9 so the second curtain is released and is drawn across the camera a certain distance behind the first curtain. As the shaft 18 rotates, the releasing cam 19 moves away from the nose 38 on the lever 34 because the latter cannot move further inward being prevented by the pawl arm 29 from such further movement.

The moment of release of the second curtain is determined by the setting of the timing cam 41. If the high point 45 of this cam is set to engage the button 35, then the nose 38 will move inwardly upon the cam 19 immediately after the shaft 18 and the cam 19 commence to rotate and therefore such a position of the timing cam 41 results in the smallest shutter opening. If the low point 46 of the cam 41 is set to engage the button, then it will take longer before the nose 38 of lever 34 has swung so far inward on the releasing cam 19 that the lever 34 can tip the pawl arm 29 to move it out of the way of the nose 43 and such setting will give the largest shutter opening. The lowest portion 47 of the cam 41 is set opposite the button 35 for time exposures. In such case the nose 38 is so far inward upon the releasing cam 19 that the lever 34 can no longer tip the pawl lever 29 to release the nose 43 on nipple 20. In this case therefore, the second curtain is not released until the photographer by relieving the pressure upon release shaft 23 permits the spring 26 to rise and lift the rod 27 and the pawl arm 29 upwards out of the plane of the nose 43. The latter and the nipple are now free to rotate and the second curtain unwinds.

It will now be understood that for snapshots the timing cam 41 is adjusted in a position to give whatever time exposure is required for the picture. The shutter opening may be varied to a very fine degree because the variations in time are not dependent upon certain fixed points but upon rotation of a cam surface which has an indefinite number of points with which the button 35 may contact. And of course in the case of snapshots the photographer simply touches the release shaft 23 and lets go thereof. In snapshotting, the second curtain is released when the releasing cam 19 moves away from the nose 38 at the end of the release lever 34 and inasmuch as the cam 19 moves with the first curtain, it follows, that the release lever swings around its pivot 35 to tip the pawl arm 29 at the exact moment determined upon by the setting of the timing cam 41, or to put it another way, the inward movement of the releasing lever 34 starts as soon as the first curtain is released and is interrupted at the moment when the button 35 hits the timing cam 41. The period of time between starting and stopping the movement of the button 35 is the time interval elapsing before the second curtain is released. The releasing lever has a double movement. It swings upon its pivot 35 and moves bodily inward upon the pivot 37.

With time exposures the button 35 is incapable of any inward movement because it already rests against the timing cam. So when the photographer depresses the release shaft 19 only the first curtain is released and when he lets go of the release shaft the second curtain is released. During the depression the pawl arm 29 has remained positioned in the path of the finger 43. The length of the time exposure is controlled by the photographer by depressing the release shaft and relieving it of pressure.

Referring now to the modification illustrated in Figures 9-14. Fig. 9 is a sectional view of the curtain releasing members on top of the curtain roller 18. Fig. 10 is a view at right angle thereto. Fig. 11 is a detail view of parts adjacent the lower end of the shaft 18. Fig. 12 is a detail top view of the curtain roller. Figs. 13 and 14 are plan detail views of the releasing mechanism.

The upper end of the curtain roller 9 is provided with a transverse slot 50 and the upper ribbon roller 7 has a spiral slot 51 which in this embodiment performs the functions of the cam 19 and the circular slot 22 described above. The shaft 18 of the curtain roller 9 carries a freely rotatable nipple 52 having a disk 53 and a finger 54. Upon the disk 53 there is pivoted at 55 a releasing lever 34. One end of this lever is formed with a tooth 56. The other end of the lever carries the depending pin 21 which extends downward through an arcuate slot 49 in the disk 53, through the spiral slot 51 and into the transverse slot 50, Fig. 12.

The vertically movable rod 27 rests upon the bottom spring 26 as before described. At its top the rod carries a pawl arm 29 which has its one end bent up to form a nose 74 adapted to engage with the timing cam 41, Fig. 13. At its other end the arm 29 is formed with two noses 57 and 58. The nose 58 is slightly higher than the nose 57, Fig. 10. A spring 39 keeps the pawl arm nose 74 in contact with the timing cam 41. The shaft 18 carries at the bottom, Figure 11, an arm 59 with a tooth 60 which is adapted to swing in under a shaft 61 to lift the same. The shaft 61 carries a forked lever 62 adapted to operate an escapement 63 for delaying the movement of the second curtain when longer exposures are desired.

The lower end of the shaft 61 is supported in a partition 128, Figure 1. The upper end carries a finger 75 and is supported in a bell crank lever 64 which is pivoted at 65. A spring 66 keeps the one end 67 of the bell crank against the timing cam 41.

When the shutter is wound up, the setting of the timing cam 41 positions the pawl arm 29, Fig. 13. The winding up operations determine the positions of the slots 50 and 51 and they in turn determine the position of the depending pin 21 and the releasing lever 34, Fig. 13. When the release shaft 23 is depressed, the shaft 18 and the ribbon drums 7 and 8 start to rotate as above described and the first curtain is released. However, the second curtain is not released. The depression of the release shaft 23 has caused the spring 26 at the bottom to be moved down, consequently the vertically movable rod 27 which carries the pawl arm 29 is free to drop down so that the nose 74 on said pawl arm 29 has dropped from its upper normal position in Fig. 10 to the lower position in Fig. 9, and the pawl nose 57 is now in the path of the tooth 56 and prevents movement of the releasing lever 34 which carries the tooth. Hence the disk 53 and the depending pin 21 cannot move. However, as the drum 9 rotates with the shaft 18, the spiral slot 51 is also rotated and now moves the pin 21 outwards in the transverse slot 50. The pin 21 therefore moves around the pivot 55 and in turn swings the tooth 56 inward past the nose 57, the tooth sliding along the edge of the nose. When the tooth 56 escapes from the nose 57, the releasing lever 34 is free to move. The pin 21 now no longer resists the pull from the spring roller 13 and the second curtain is released. The closer the nose 74 is positioned to the shaft 18, the greater the shutter opening because it takes so much longer for the tooth 56 to escape from the nose 57 and of course vice versa. When the photographer lets go of the release shaft 23, the bottom spring 26 of course moves the vertically movable rod 27 upwards and thereby lifts the pawl 29 back into its upper normal position.

Time exposures are made by setting the cam 41 in a position which merely requires the photographer to press down the release shaft 23 and keep it down for the duration of the exposure. Or the cam 41 may be set in a different position which requires the operator to open the shutter by pressing the release shaft down and then relieves the pressure when the shutter is opened. The shutter is then closed by pressing down the release shaft once more. Time exposure with a single pressure upon the release shaft may also be made accompanied by the automatic cutting in of the escapement to increase the length of exposure.

In the first case (pressing the release once) the cam 41 is set so that the high point 69 of the cam is opposite the bent up nose 74 of the pawl arm 29. This brings the low point 70 of the cam opposite the bell crank nose 67 which swings inward and the arm 64 with the finger 75 swings outward. This also positions the pawl nose 57 so far inward that the tooth 56 cannot escape it. When the photographer presses down upon the release shaft 23, the first curtain is released as before. The tooth 56 cannot escape so the second curtain cannot move. The exposure is therefore on so to speak. The photographer now relieves the shaft 23 and the spring 26 raises the rod 27 and pawl arm 29 and thereby moves the nose 57 upward so that the tooth 56 becomes free to move and the second curtain is released to finish the time exposure.

It will of course be noted that when the shaft 18 is rotated, the arm 59 and tooth 60 at the bottom of said shafts have also been rotated and the shaft 61 has been raised, but the escapement 63 has not been actuated because the shaft 61 has not been rotated and the forked lever 62 has simply been moved up and down with the shaft.

In the second case of time exposure (pressing the release twice) the cam 41 is set so that another high point 71 is opposite the nose 74 in order to swing the nose 57 furthest inward. The first high point 69 of the cam is now opposite the bell crank 67 so that the arm 64 is swung inward into the path of the finger 54. The operation now is as follows. The photographer depresses the release shaft 23 and the first curtain opens. The pawl arm 29 drops down as before. The photographer now lets go of the release shaft. Then the spring 26 lifts the rod 27 and the pawl arm 29 up into the position shown in Figure 10 where the arm is above the lever 34 and the tooth 56 is free to move. However, the second curtain can now only move a short distance because the finger 54 on the nipple 52 moves against the arm 75 which latter cannot move because the other nose 58 on the arm 29 is now in the same plane as the finger 75 and prevents the latter from moving. The release shaft 23 is now depressed again. The pawl arm again drops and nose 58 drops from the finger 75. The finger 54 is no longer prevented from moving so the second curtain is released to finish the exposure.

Shutter operation with retarded second curtain by including the operation of the escapement 63 is obtained by setting the cam 41 so that the portion 72 is opposite the bell crank arm 67 and the cam portion 73 is opposite the bent up nose 74.

The operation is now the same as for simple time exposure just described with this difference that because of the different position of the cam 41, the tooth 56 is capable of some movement along the edge of the nose 57. Just before the tooth escapes from the nose, the tooth 60 at the bottom of shaft 18 has again lifted the shaft 61 and finger 75 into the path of the finger 54. As the latter now hits the finger 75, the shaft 61 is rotated, the forked lever 62 at the bottom thereof starts the escapement 63 which delays the movement of the fingers 75 and 54. The delay in the rotation of the latter of course delays the closing movement of the second curtain. The short movement of the release lever 34 just referred to is for the purpose of starting the gear mechanism 63.

It will therefore be seen that the mechanism shown in Figs. 9–14 may be operated for snapshots with exposure openings of varying widths. It may be operated for time exposure by depressing the release shaft 23 once and holding it down for the length of the exposure. It may be operated for time exposure by pressing the release shaft at the beginning and at the end of the time exposure. Finally, by setting the cam 41 accordingly, the escapement for automatic prolonged exposure may be connected. The latter is of course due to the fact that the tooth 56 is able to move sufficiently to bring the finger 54 into contact with the finger 75 so as to start the escapement, whereas with simple time exposure and double pressure upon the release 23, the tooth 56 cannot move in time to start the escapement. A gear 79 at the top of the shaft 18 may be used for the operation of a photometer, not shown.

The modification illustrated in Figs. 9–14 differs from the disclosure in Figs. 2–8 in that the release lever 34 is mounted directly on the nipple 52 and it includes the possibility of coupling the escapement. The latter may be included in the first construction by providing a second finger 80 on the nipple 20 in Figs. 7 and 8.

The modified construction illustrated in Figs. 15–21 includes certain features of construction which make the operation more simple and certain. The several views are as follows. Fig. 15 is a view in elevation of the lower portions of the shutter mechanism. Fig. 16 is a detail side view of certain parts shown in Fig. 17. Fig. 17 is a plan view thereof with parts in section. Figs. 18, 19 and 20 are side views with parts in section and parts broken away of the releasing mechanism mounted between the upper partition 28 and the camera casing 1. Fig. 20 is a sectional view taken substantially on the line 20—20 in Fig. 21. Fig. 21 is a plan view of the releasing mechanism. In the several views such parts as are alike or which have the same function as similar parts in the foregoing views are numbered with the same numbers for easy identification.

In this modification there is mounted alongside the second curtain roller 9 a vertically movable rod 27 which is supported at the top in the partition 28 and at the bottom it is engaged by a spring 82 supplemental to the bottom spring 26, Figs. 15 and 17. At the top the rod 27 carries a head 83. A pin 105 passes through the head 83 and prevents it from turning. The head carries on its underside a button 84, a catch 85 and a stop 86. Immediately above the partition 28 there is pivoted on the rod 27 a bell crank stop pawl lever which includes a pawl arm 29 and a stop arm 87. The pawl arm has a bearing 88 surrounding the rod 27, cut away as shown in Fig. 18 in order to accommodate the head 83. Upon the pawl arm 29 there is pivoted at 106 a releasing lever 34 with a cam roller 89 and an upstanding button 90. The cam roller is kept against the releasing cam 19 by a spring 39 which therefore also serves to keep the pawl arm 29 against the stop pin 40. The rod 27 is engaged at its lower end by the spring 82 which lies above the spring 26 and tends to lower the rod. A third cam 96 is located above the timing cam 41 and moves therewith.

When an exposure is to be made the timing cam 41 is adjusted accordingly so that said cam always has a portion of its surface positioned underneath the button 84 on the head 83, except in the case of time exposures when the notch 91 in the cam is adjusted in line with said button. Assuming that a snapshot is to be taken the operation is as follows. The photographer depresses the release shaft 23 and simultaneous therewith the supplemental bottom spring 82 tends to pull down the rod 27 and the head 83. The button 84 is however spaced but a very slight distance above the cam 41, sufficient for clearance, so that the downward movement of the head 83 is hardly perceptible. As a matter of actual operation it may be said that there is no vertical movement by any of the release members when a snapshot is being made. The first curtain is now released as above described and starts to open. The second curtain cannot move at this time because the depending pin 21 upon the nipple 20 is prevented from rotating, the finger 43 at the top of said nipple being held against rotation by the pawl arm 29. The releasing cam 19 rotates with the shaft 18, hence the releasing lever 34 swings inwardly on its pivot 106 until its button 90 meets the timing cam 41. The spring 39 now causes the releasing lever 34 to be tipped about the button 90, which serves as a pivot for the tipping movement. The pivot 106 is therefore moved outward about the pivot 27 and the pawl arm 29 is swung against the stop pin 44 out of the path of the finger 43. The latter is released and the second curtain starts to move to finish the exposure. The cam 19 has by this time moved away from the cam roller 89 because further inward movement of the releasing lever 34 is prevented by the pawl arm 29 which now is held against the stop pin 44.

The different shutter openings are obtained by setting the cam 41 so that the movement of the releasing lever 34 is correspondingly interrupted by engagement of the button 90 with the cam 41. If the high point 92 of the cam 41 is set opposite the button 90, then one obtains the smallest shutter opening because the pawl arm 29 is almost immediately removed from the path of the finger 43. If the low point 93 is opposite the button 90 then the largest shutter opening is obtained because it takes then so much longer before the finger 43 is released.

The third cam 96 which is set together with the timing cam 41 regulates the movements of the bell crank 64 which supports the upper end of the shaft 61 described above. The lower end of the shaft 61 carries a flat spring 94, Fig. 16 which lies in the path of a tooth 60 upon an arm 59 fast to the shaft 18. When the high part 92 of the timing cam 41 is set opposite the button 90, the bell crank arm 67 is on the low part of the cam and the shaft 61 is swung so far outward that the arm 75 does not project into the path of the second finger 80 of the nipple 20. For each rotation of the shaft 18, the shaft 61 is raised by the tooth 60 but the shaft is not rotated and the escapement 63 is not actuated. Only when the cam 41 positions the bell crank arm 64 as shown in Fig. 21 is the shaft 61 swung so far inward that the arm 75 is in the path of the finger 80.

For time exposures by merely depressing and then relieving the release shaft 23, the cam 41 is set with the notch 91 opposite the button 84, and the uppermost cam 96 will then have been moved so that the shaft 61 and finger 75 are out of the path of the other stop finger 80. When the release 23 is operated, the first curtain is released and the head 83 is moved down by the supplemental spring 82 so that the catch 85 comes in front of the pawl stop arm 87 and prevents it from being operated, the button 84 having passed through the notch in the cam. When the pressure upon the release shaft 23 is relieved, the head 83 is moved by the springs 26 and 82, the stop arm 87 is released, the pawl arm 29 is operated and the second curtain is released to close the exposure.

For time exposures with double depression of the release shaft 23 the cams 41 and 96 are set as shown in Fig. 21. The first depression of the release shaft starts the first curtain as before. When the pressure is released, the finger 43 is free to move to start the second curtain. The latter can however move only a short distance because the other finger 80 engages against the finger 75 which is now held immovable by the stop 86 upon the head 83 which has been raised into the path of the finger 75. By pressing the second time, the head 83 is again moved down. The stop 86 is moved below the finger 75 and now the finger 80 can swing the latter out of the way and the second curtain starts. In the first time exposure operation by pressing only once, the stop 86 is held below the finger 75 so the latter offers no resistance to the movement of the finger 80 and the second curtain.

For time exposure including delay by operation of the escapement 63, the timing cam 41 and the third cam 96 are set so that the low point is opposite the button 90 and the bell crank arm 67 is on the low part of cam 96. When the release shaft is depressed, the head 83 is moved down upon the cam 41. The first curtain starts and the pawl arm 29 is operated as above described to release finger 43, the head 83 having been raised as before. But before finger 43 is released, the tooth 60 at the bottom of the shaft 18 has moved in under the spring 94, Fig. 16, and raised the shaft 61 and finger 75 into the path of the other finger 80 which therefore rotates under the influence of the escapement 63 as above described and delays the closing of the second curtain.

The delay caused by the escapement 63 may be varied by adjusting the movements of the bell crank 64 so as to regulate the position of the finger 75 closer in or further out in the path of the finger 80.

A still further modification is illustrated in Figs. 22–26 in which Fig. 22 is a sectional side view of the release members taken on the line 22—22 of Figure 23. Fig. 23 is a plan view and Figs. 24–26 illustrate different positions of the bottom springs. Inasmuch as the construction is very similar to that shown in Figure 21, the parts which are alike or function in the same manner have the same numbers.

In this modified construction the rod 27 carries at the top a head 83 which is connected to the pawl stop lever 29 by a pin 97 so that in this construction the head 83 swings with the arm around the rod 27. A third cam 96 is mounted on top of the releasing and timing cams 19 and 41, and is used for time exposures. Directly below the housing 1 there is a disk 98 having a slot 99 with bevelled edges. The disk 98 moves with the knob 42. An upstanding tooth 100 carried by the head 83 lies normally within the slot 99 and is adapted to be depressed when the disk is rotated, the bevelled edges of the slot 99 then engaging the tooth 100. The rod 27 rests upon a spring 101 mounted below the release supporting spring 26, the rod having a reduced portion which passes through the latter as shown in Figs. 24–26. When the head 83 and the rod 27 are depressed by the disk 98, the pressure of the spring 101 is removed from the spring 26 and it causes a smoother release.

When a snapshot exposure is to be made, the operator sets the knob 42 in the corresponding position. By this operation the disk 98 and the cams 96 and 41 are rotated. The head 83 and rod 27 are depressed by the disk. When the release 23 is operated the first curtain starts to move, but the second curtain is held fast by the finger 43 as above described. When the button 90 contacts the timing cam 41 due to the inward movement of the cam lever 34, the bell crank pawl stop lever 29 swings anticlockwise in Fig. 23 and releases the finger 43 and the second curtain is released. When the release 23 is depressed the spring 26 is depressed into the position shown in Fig. 25. When the pressure on the release is relieved, the rod 27 and head 83 are again moved upwards by the springs. A button 102 separates the spring to facilitate their individual operation. For time exposures the knob 42 is rotated so as to position the disk 98 and the cams 96 and 41 as shown in Fig. 23. The disk has a nipple 103 which carries a horizontal finger 104 in alinement with the slot 99. When the release is actuated the spring 26 at the bottom pulls down the rod 27 and the head 83 is now at the same level as the finger 104. Consequently the second curtain cannot be moved because the finger prevents inward movement of the head 83 and of the pawl bell crank 29. However, when the operator relieves the pressure upon the release, the springs at the bottom lift the rod 27 and the head 83 above the finger 104 so that the pawl arm 29 can be moved to release the finger 43 as above described. The second curtain can now move and finish the exposure. The bell crank 67, the shaft 61 and arm 75 function as above described.

The construction in Figs. 22 and 23 is not adaptable for operation by twice depressing the release but permits a more resilient release and has less parts. These may be still further decreased in number if one desires to do without the second spring 101. In such case of course the disk 98 can also be eliminated. This construction is not specifically illustrated.

It will be noted that the constructions herein disclosed all have as a common feature that the first shutter curtain is operated mechanically independent of the second shutter curtain. That is to say, the first curtain is not coupled with or connected to the second curtain, hence the size of the shutter opening, i. e., the time exposure used in snapshots, does not depend upon any mechanical spacing member between the curtains, nor upon any gearing or other operating mechanism between the curtains or which may operate as such. Consequently the several forms of the invention embody the main feature of the invention which is that of operating the curtains independently of each other whereby advantage is taken of the natural increase in speed to provide shutter openings of increasing width towards the end of the exposures to insure even exposure for all parts of the film. The fact that the timing of the release of the second curtain depends upon the position of a cam surface obviously provides a finer degree of timing than can be had with constructions using stepwise setting of the timing member.

We claim:—

1. A shutter mechanism for cameras comprising two normally closed shutter curtains and devices for operating the same to produce an exposure opening of a predetermined width at the beginning of an exposure and automatically increasing the width of the opening during the exposure, said devices comprising means for releasing the curtains separately and successively to open the shutter and means for moving the opened curtains, one independently of the other, across the objective field of the camera at approximately the same acceleration of speed at equal points of their travel.

2. A shutter mechanism for camera comprising two normally closed shutter curtains and devices for operating the same to produce an exposure opening of a predetermined width at the beginning of an exposure and automatically increasing the width of the opening during the exposure, said devices comprising means for releasing the curtains separately and successively to open the shutter, an adjustable timing cam for determining the width of the shutter opening at the beginning of an exposure and means for moving the opened curtains, one independently of the other, across the objective field of the camera at approximately the same acceleration of speed at equal points of their travel.

3. A shutter mechanism for cameras comprising two normally closed shutter curtains, devices for opening said curtains to produce an exposure opening, said devices including means for releasing said curtains successively and moving the same, one curtain independently of the other curtain, at approximately the same acceleration of speed at equal points of their travel across the objective field of the camera.

4. A shutter mechanism for camera comprising two normally closed shutter curtains, devices for opening said curtains to produce an exposure opening, said devices including means for releasing said curtains successively, moving the same, one curtain independently of the other curtain, at approximately the same acceleration of speed at equal points of their travel across the objective field of the camera and an adjustable timing cam controlling the releasing moment of the curtain last released.

5. A shutter mechanism for cameras comprising two normally closed shutter curtains, mechanisms for opening said curtains to provide an exposure opening and moving the opened curtains across the objective field of the camera with a constantly increasing opening between them, and means for adjusting the opening between the curtains at the beginning of their said movements, said adjusting means being operable independent of the turning movements of the shutter mechanism.

6. A shutter mechanism for cameras comprising two normally closed shutter curtains and devices for opening and moving the same to produce an exposure opening automatically increasing in width whereby to evenly expose a photographic element, said devices including means for releasing the curtains successively at predetermined variable time intervals and means for moving each curtain independently of the other curtain during an exposure.

7. A shutter mechanism for cameras comprising a first curtain, means for releasing the same to produce an exposure opening, a second curtain mounted to move independently of the first curtain when the latter has been released, mechanism for releasing the second curtain including a stop pawl mechanism for retarding the latter, means for operating said stop pawl mechanism to release the second curtain, and a timing cam for interrupting the operation of the stop pawl mechanism at a predetermined time interval after the release of the first curtain.

8. A shutter mechanism for cameras comprising a first curtain, means for releasing the same to produce an exposure opening, a second curtain mounted to move independently of the first curtain when the latter has been released, mechanism for releasing the second curtain including a stop pawl mechanism for retarding the latter, means for operating said stop pawl mechanism to release the second curtain, a timing cam for interrupting the operation of the stop pawl mechanism at a predetermined time interval after the release of the first curtain, and means for moving the said two curtains independently across the objective field at the same acceleration of speed at equal points of their travel.

9. The combination of two camera shutter curtains, normally held in shutter closed positions, a device for releasing said curtains successively with a time interval therebetween and for moving the curtains, one separately and independently from the other, across the objective field at the same acceleration of speed at equal points of their travel to produce an exposure opening of constantly increasing width, a releasing mechanism operatively connected to both of said curtains, means for operating said releasing mechanism to prevent the release of the second curtain until a predetermined time interval has elapsed succeeding the release of the first curtain and means, movable with the first curtain when it has been released, for interrupting the operation of the said releasing mechanism when the said time interval has elapsed.

10. The combination of two camera shutter curtains, normally held in shutter closed positions, a device for releasing said curtains successively with a time interval therebetween and for moving the curtains, one separately and independently from the other, across the objective field to produce an exposure opening, said device including a shaft which rotates with the release of the first curtain, a member which rotates when the second curtain is released, a pawl stop mechanism automatically movable from an inactive position into the path of the said member, means movable with the said shaft for operating said pawl stop mechanism out of the path of said member to release the second curtain, a timing cam for interrupting the operation of said pawl stop mechanism to move the same out of the path of the said element after a predetermined elapse of time succeeding the release of the first curtain and means automatically restoring the pawl stop mechanism to its normal inactive position.

11. A camera shutter mechanism comprising a first and a second normally closed curtain successively released to produce an exposure opening, a release mechanism controlling the release of the second curtain comprising a member rotatable with the second curtain, a pawl having a normally inactive position, means automatically moving the pawl into the path of said member when the first curtain is released, a lever for moving the pawl out of the path of said member, a releasing cam controlling the movement of said lever, a timing cam, for interrupting the movement of said lever to cause it to move the pawl out of the path of said member and release the latter for rotation with and release of the second curtain and a shaft movable with the first curtain and supporting the said releasing cam.

12. A camera shutter mechanism comprising a first and a second normally closed curtain successively released to produce an exposure opening, a release mechanism controlling the release of the second curtain comprising a member rotatable with the second curtain, a swingable release lever supporting said member, a pawl lever for engaging said release lever to retard the movements thereof, said pawl member having a normally inactive position, automatic means moving the pawl lever into the path of the said release lever, means rotatable when the first curtain is released for moving the release lever away from the said pawl lever and a timing cam for interrupting the movements of the pawl lever whereby to time the release of the second curtain.

13. A camera shutter mechanism comprising a first and a second normally closed curtain successively released to produce an exposure opening, a releasing mechanism controlling the time interval between the release of the curtains and comprising a shaft rotatable with the release of the first curtain, a nipple on said shaft freely rotatable about the same, a pin on said nipple in operative relation with the second curtain, a finger on said nipple, a pawl stop lever preventing movement of said finger, nipple and pin, a timing cam, a releasing cam upon said shaft for moving said pawl stop lever into engagement with the timing cam to move said lever out of the path of rotation of said finger to release the said pin and the second curtain and spring rollers for moving each curtain separately across the objective field of the camera.

14. A camera shutter mechanism comprising a first and a second normally closed curtain successively released to produce an exposure opening, a releasing mechanism controlling the time interval between the release of the curtains and comprising a shaft rotatable with the release of the first curtain, a nipple on said shaft freely rotatable about the same, a pin on said nipple in operative relation with the second curtain, a finger on said nipple, a pawl stop lever normally in the path of said finger to prevent rotation of the nipple, a releasing cam operating said lever to permit rotation of the nipple, a vertically movable head, a timing cam normally preventing vertical movement of the head, a notch in said timing cam permitting movement of the head for time exposures, means moving the head downward past said notch to cause the head to engage the pawl stop lever to prevent operation thereof when the first curtain is released and automatic means moving said head back into normal position to cause the aforesaid releasing cam to operate the pawl stop lever to release the said nipple and the second curtain.

15. A camera shutter mechanism comprising a first and a second normally closed curtain successively released to produce an exposure opening, a releasing mechanism controlling the time interval between the release of the curtains and comprising a shaft rotatable with the release of the first curtain, a nipple on said shaft freely rotatable about the same, a pin on said nipple in operative relation with the second curtain, a finger on said nipple, a pawl stop lever preventing movement of said finger, nipple and pin, a timing cam, a releasing cam upon said shaft for moving said pawl stop lever into engagement with the timing cam to move said lever out of the path of rotation of said finger to release the said pin and the second curtain, spring rollers for moving each curtain separately across the objective field of the camera, an exposure prolonging gear mechanism, means for coupling the same to the said releasing mechanism and a stop on the said head for retarding the movement of the said nipple whereby to cause the coupling means to couple the said delaying mechanism to the releasing mechanism.

16. A camera shutter mechanism comprising a first and a second normally closed curtain successively released to produce an exposure opening, a releasing mechanism controlling the time interval between the release of the curtains and comprising a shaft rotatable with the release of the first curtain, a nipple on said shaft and freely rotatable about the same and in operative connection with the second curtain, a pawl stop mechanism preventing rotation of said nipple, a disk having a slot, a lug, means positioning the same within the slot, an arm movable with the pawl stop mechanism and having a tooth, means for moving said arm whereby to engage said tooth and lug to prevent movement of the pawl stop mechanism to delay the release of the second curtain and means for disengaging said tooth and lug to cause the pawl stop mechanism to release the said nipple and second curtain.

17. The combination of two camera shutter curtains normally held in shutter closed positions, a device for releasing said curtains successively and separately and for moving the curtains, one independently of the other, across the objective field to produce an exposure opening, said device including a finger which rotates when the second curtain is released, a stop pawl normally in the path of said finger to prevent rotation thereof and release of the second curtain, mechanism for automatically moving said stop pawl out of the path of said finger to release the second curtain, a cam having a continuous curved surface engaging and controlling the operations of the said mechanism whereby to actuate the same after a predetermined interval of time succeeding the release of the first curtain and a timing knob operatively connected to said cam to operate the same.

18. A shutter mechanism for cameras comprising two normally closed shutter curtains, mechanism for opening said curtains to provide an exposure opening and moving the opened curtains, one independently of the other, across the objective field of the camera with a constantly increasing opening between them, a timing rotatably adjustable cam adapted to be adjusted to determine the width of the exposure opening when the shutter is opened, a timing knob for adjusting said cam and means for maintaining said timing cam immovable in its adjusted position while the shutter is being operated as aforesaid and to remain immovable in its adjusted position while the shutter is being operated.

19. A shutter mechanism for cameras comprising a first and a second independently movable curtain normally held in shutter closed position, means for releasing the first curtain to open the shutter, means for releasing the second curtain to close the shutter, an escapement for delaying the closing of the shutter, a timing cam for adjusting the width of the exposure opening when the shutter is opened, a second cam operatively connected with the timing cam for controlling the operation of the said delaying device and a timing knob for adjusting and operating the said two cams.

20. In a shutter mechanism for cameras comprising a first and a second independently releasable and movable curtains normally held in shutter closed position, means for releasing the first curtain to open the shutter, means for releasing the second curtain to close the shutter, a timing cam adjustable to determine the moment of release of the second curtain with respect to the first curtain, an escapement operable between the releases of the said two curtains to delay the release of the second curtain and a second cam secured to and movable with the timing cam for controlling the operation of the said escapement and means for operating the said two cams.

21. A shutter mechanism consisting of two shutter curtains normally held in shutter closed position, devices for releasing the curtains separately and successively with a time interval therebetween and for moving said curtains, one independently of the other, to produce an exposure opening, said device including a curtain supporting shaft rotatable with the release of the first curtain, a timing cam for adjusting the width of the exposure opening when the shutter is opened, means for operating said timing cam, an escapement for delaying the release of the second curtain and a cam movable with the said timing shaft for controlling the operation of the said delaying device.

LUDWIG LEITZ.
WILLI STEIN.